United States Patent [19]

Caën

[11] Patent Number: 5,841,264

[45] Date of Patent: Nov. 24, 1998

[54] METHOD OF STEPWISE VOLTAGE CONTROL FOR SUPPLYING AN INDUCTION MOTOR

[75] Inventor: Claude Caën, 1 rue Louise Pasteur, 92100 Boulogne Billancourt, France

[73] Assignees: Claude Caen, Boulogne Billancourt; Cecile Kohen, Antony, both of France

[21] Appl. No.: 750,597

[22] PCT Filed: Jun. 20, 1995

[86] PCT No.: PCT/FR95/00817

§ 371 Date: Dec. 19, 1996

§ 102(e) Date: Dec. 19, 1996

[87] PCT Pub. No.: WO95/35594

PCT Pub. Date: Dec. 28, 1995

[30] Foreign Application Priority Data

Jun. 22, 1994 [FR] France ................................. 94/07635

[51] Int. Cl.⁶ ............................. H02P 5/34; H02P 7/622
[52] U.S. Cl. ......................... 318/727; 318/800; 318/803
[58] Field of Search ..................................... 318/727–839

[56] References Cited

U.S. PATENT DOCUMENTS

| 4,047,083 | 9/1977 | Plunkett | 318/231 |
|---|---|---|---|
| 4,215,304 | 7/1980 | D'Atre | 318/758 |
| 4,215,305 | 7/1980 | D'Atre | 318/803 |
| 4,243,927 | 1/1981 | D'Atre | 318/803 |
| 4,267,499 | 5/1981 | Kurosawa | 318/800 |
| 4,565,957 | 1/1986 | Gary et al. | 318/723 |
| 4,885,518 | 12/1989 | Schauder | 318/798 |
| 5,334,923 | 8/1994 | Lorenz et al. | 318/805 |

*Primary Examiner*—Paul Ip
*Attorney, Agent, or Firm*—Oblon, Spivak, McClelland, Maier & Neustadt, P.C.

[57] ABSTRACT

A method for stepwise voltage control using thyristors for supplying an induction motor at a fixed frequency and a variable voltage. A time sequence of electromotive force amplitudes corresponding to a predetermined law for torque variation during transient operating conditions is stored. Voltages applied to the motor and the current flow are determined to approximate the electromotive force generated by the motor. Static switch conduction intervals are used to adapt the electromotive force to the stored amplitude during the transient operating conditions.

7 Claims, 2 Drawing Sheets

METHOD OF STEPWISE VOLTAGE CONTROL FOR SUPPLYING AN INDUCTION MOTOR

This application is a 371 of PCT/FR95/00817 filed on Jun. 20, 1995.

BACKGROUND OF THE INVENTION

1. Field of the Invention

The present invention concerns a method of stepwise voltage control using thyristors for supplying an induction motor at a fixed frequency and at a variable voltage, more particularly in the situation in which the load that it drives has a quadratic torque-speed law, noteworthy in that it combines great simplicity of the equipment with a level of performance in terms of progressive stopping and starting that has hitherto been unattainable using more complex equipments such as frequency converters.

2. Discussion of the Background

Electronic starters for induction motors have achieved significant penetration of the industrial market in the last ten years, replacing older generation electrotechnical hardware such as star-delta switches, autotransformers and liquid rheostats. Their success is related to advances in power semiconductors (increased reliability and economic competitivity), on the one hand, and to advances in digital control circuits having an increasing processing capacity, on the other hand. Among the various electronic speed variation systems, the electronic starter represents the simplest means of controlling the speed of induction motors: in a system of this kind, the power circuit or three-phase stepwise voltage controller typically comprises a set of three alternating current switches each in series with one phase between the AC line voltage and the motor, each switch typically comprising two thyristors connected in anti-parallel. The fact that these switches change state at a low frequency, namely that of the AC line voltage, and do not require any turn-off control, as turn-off occurs naturally when the current passes through zero, also simplifies the control circuits. However, these starters can only control the amplitude of the motor voltage, at the fixed frequency of the AC line voltage. By comparison, frequency converters have a more complex structure, as much from the point of view of the power circuit, typically comprising a three-phase power transistor bridge with the rupture capacity needed to switch the motor current at a frequency of at least a few kilohertz, as from that of the control circuit, which has to generate variable voltage and frequency waves by pulse width modulation. To compensate this, they have a second control quantity, namely the frequency, which can be varied independently of the magnetic flux and the torque to optimize the operation of the motor at each point, in particular with regard to slip and losses. As a result, applications are divided between frequency converters and electronic starters, the former offering high performance and the latter moderate cost.

Given the trend for increasingly higher performance of digital control circuits, it has now become possible to expand the field of applications of electronic starters into that of frequency converters. For example, starting and stopping pumps represents a particular problem due to the existence of mechanical resonance that is manifested on the occasion of a rapid variation in flowrate by oscillation of the fluid in the pipe, known as "water hammer". This phenomenon is harmful as much through its reduction of the service life of the installation as through the accompanying acoustic noise. This noise is particularly unacceptable in water distribution installations in urban areas. Previous means of solving this problem tend to eliminate all sudden variation in the flow, and therefore in the speed, during stopping or starting. They use two techniques:

- modulation of the flowrate by a progressive action solenoid valve;
- variation of the speed of the pump by a speed regulator, generally consisting of a frequency converter and an alternating current motor.

Both methods have the same drawback, namely high cost, increasingly so with increasing power levels, the latter being routinely between 10 kW and 500 kW. Efforts to date to eliminate "water hammer" when stopping a pump, by regular deceleration commanded by a basic electronic starter, have failed. It is well known that varying the voltage at constant frequency introduces a discontinuity into the voltage-speed characteristic of the induction motor: below a certain speed which additionally depends on the speed-torque characteristic of the load but which, in the case of a pump, can be as high as two-thirds the nominal speed, operation becomes unstable and during deceleration the motor "stalls" and suddenly drops to a low speed, while during acceleration the motor "runs away" and is out of control between a low speed and the stable operating speed. This behavior causes "water hammer" and the electronic starter has therefore proved to be unsuitable for solving this problem.

SUMMARY OF THE INVENTION

The aim of the present invention is to propose an electronic starter control method that assures stable behavior of the starter over all of the range of speeds between zero and the nominal speed and which, in the presence of a load with a quadratic torque-speed characteristic, is capable of starting and slowing performance comparable with that of a frequency converter and eliminates the phenomenon of "water hammer" during slowing of a pump, under more advantageous economic conditions.

The method of the invention is intended for a stepwise voltage control type power circuit such as that made up of a three-phase system of three static switches each of which comprises two thyristors connected in anti-parallel, placed between the AC line voltage and the induction motor supplied with power, each in series with one phase of the AC line voltage, or possibly of the motor alone in the case of a delta connected motor. It uses a phase variation thyristor control system, known in itself, for example from "Induction machine SCR voltage reduction; optimized control and dynamic modelling", by A. P. Van den Bossche and J. A. Melkebeeke, IEE Conference Publication Number 234, London 1984. Note however, that the method of varying the motor voltage described therein, by adjusting the angle of non-conduction of the switches, is to be understood as constituting only one example and can be replaced by any other method, such as the more conventional method in which the control magnitude is the phase at which the switches are turned on relative to the phase of their supply voltage.

The invention therefore proposes a method for time control of transient operating conditions of a multiphase induction motor driving a load the resisting torque of which varies with the speed in accordance with a known law and supplied at variable voltage via static switches having periods of conduction of variable duration, characterized in that, having memorized a time succession of rotor electromotive force amplitudes corresponding to a predetermined law of torque variation under transient operating conditions, the voltages applied to the motor and the current passing through it are determined, the amplitude of the rotor electromotive force developed by the motor is at least approximately deduced and the conduction intervals of the static switches are varied to adjust the amplitude of the rotor electromotive force developed to the corresponding amplitude memorized under the transient operating conditions.

In accordance with an advantageous development of the invention, the voltages applied to the motor and the current flowing through it are sampled in a substantially synchronous manner and the sampled values are converted into digital signals, the rotor electromotive force amplitude being deduced from the aforementioned digital signals by computation in the digital domain, the rotor electromotive force being treated as a vector.

This approach exploits the advantageous performance of commercially available digital control circuits.

In accordance with another aspect of the invention, the set point value of the rotor electromotive force or its approximate expression is determined by a time law adapted to produce the required acceleration or deceleration. This law is based on the torque-speed characteristic of the driven load, and possibly on its inertia, by application of the following formula:

$$e = (c/g)^{1/2}$$

where e is the rotor electromotive force, g is the slip, c is the motor torque, e, g and c being expressed as a proportion of the nominal rotor electromotive force, slip and torque of the motor, respectively.

The features and advantages of the invention will emerge from the following description given by way of example with reference to the accompanying drawings in which FIGS. 1 and 2 show two complementary parts of a block diagram showing the application of the invention to controlling a three-phase induction motor.

In the selected embodiment shown, a short-circuit rotor three-phase induction motor M has three stator windings connected in a star configuration and supplied with power via terminals S1, S2 and S3. The latter are connected to the conductors of a three-phase AC line voltage V1, V2, V3 through respective switches I1, I2, I3 each made up of a pair of thyristors connected in anti-parallel. The triggers of the thyristors are driven by the output of respective pulse transformers T1, T2 and T3. Current transformers TI1, TI2 and TI3 are connected in series with the three phases.

DISCUSSION OF THE PREFERRED EMBODIMENTS

Figure 1:
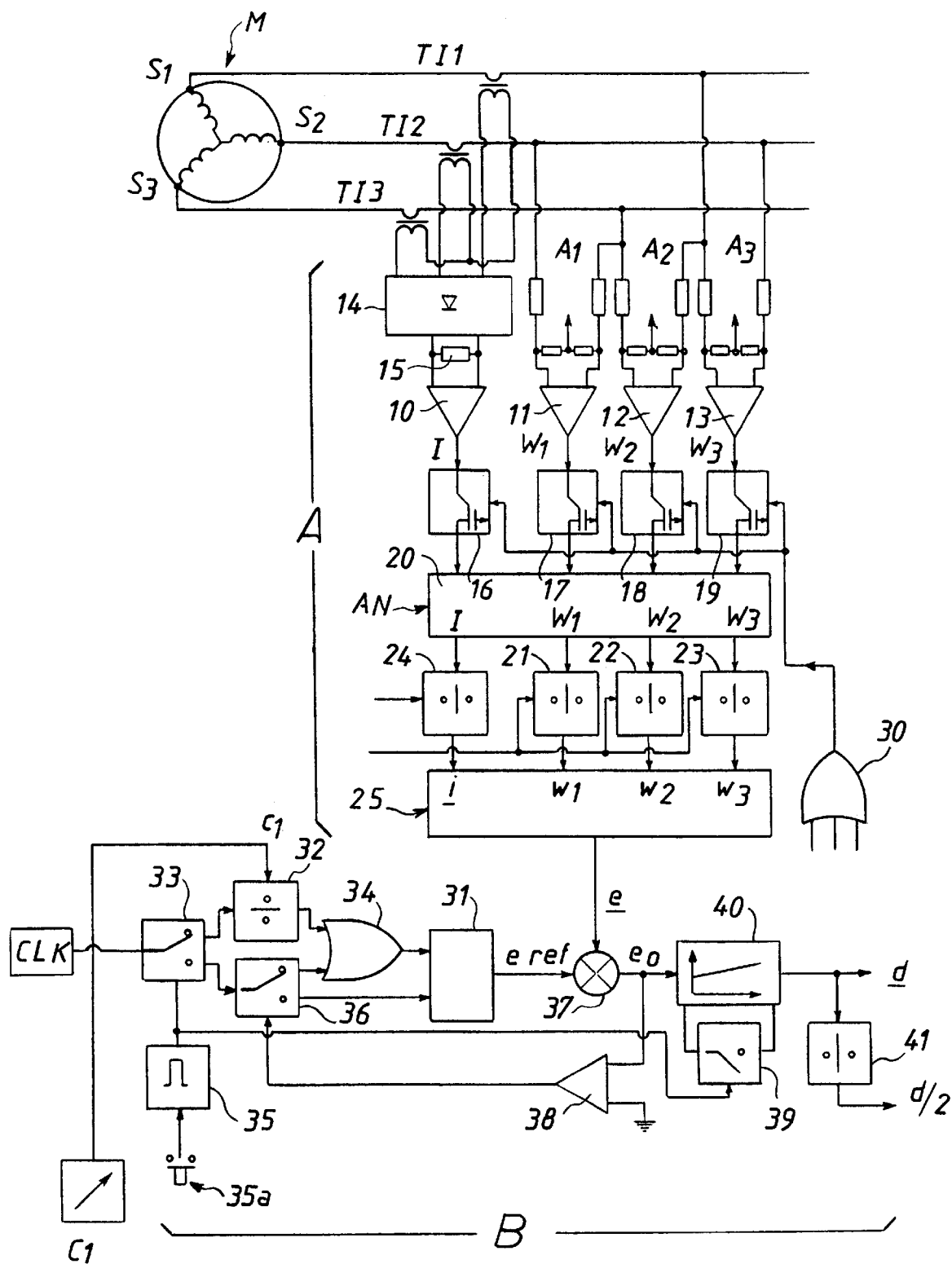
FIG. 1 shows a set A of elements for determining the rotor motor electromotive force and a set B for producing the rotor electromotive force set point.

The three subassemblies are described in turn hereinafter, noting that they include digital processing elements although for clarity these are represented by means of hardwired logic symbols.

A) Measuring the Electromotive Force

Three differential amplifiers 11, 12, 13 each associated with a respective attenuator network A1, A2, A3 with an attenuation approximately equal to 100 and each made up of four resistors, deliver three voltages W1, W2, W3 imaging the three voltages between phases of the motor M1. Likewise the amplifier 10 supplies a voltage I imaging the rectified value of the three-phase current from M provided by the secondary currents of TI1, TI2 and TI3 flowing through the three-phase rectifier bridge 14 and a load resistor 15. The four signals I, W1, W2 and W3 are sampled by four sample and hold circuits 16, 17, 18 and 19, respectively, and passed to an analog-digital converter 20. The sampling time for each of the three switches I1, I2 or I3, near the middle of a non-conduction interval, is defined by the OR logic function 30, as explained further below. Dividing them by the nominal value of the voltage between phases Wn at 21, 22 and 23 reduces the three voltages W1, W2, W3 to the values w1, w2, w3. Dividing it by the nominal value In of the current from M (24) reduces I to the value i. The rotor electromotive force e is calculated (25) from w1, w2, w3 and i using the equation:

$$e = \{\tfrac{1}{3}[\tfrac{1}{2}(wj+1-wj-1)^2 + (wj-0.02\ i)^2]\}^{1/2}$$

B) Production of the Electromotive Force Set Point e ref

Consider first deceleration to a stop within a time Ta. The value of e ref programmed in a memory 31 at the address n is written:

$$e\ ref(n) = 0.2(1-n/m)(n/m)^{-1/2}$$

with:

$$0 < n \leq m$$

and:

$$e \leq 1$$

m being the total numbers of registers used in the memory 31 to define the law in accordance with which e ref varies during stopping. The stop time Ta is varied by means of a binary switch C1, the set value c1 of which initializes the counter 32 on each passage through zero. This counter therefore divides the frequency f of an internal clock CLK to which it is connected by a switch 33 by c1. In each period of the frequency obtained in this way, the address of the memory 31 is incremented by one unit via the OR logic function 34. The theoretical stopping time Ta is given by:

$$Ta = m(c1/f)$$

At the start of the stopping process, the value of n is initialized during a phase having a duration of several tens of milliseconds, defined by a monostable function 35 activated by a pushbutton 35a. During this phase, the switch 33 routes the frequency f to a switch 36 which increments via the OR function 34 or decrements the address n of the memory, depending on whether the sign of the error $$e_0 = e\ ref(n) - e$$

is positive or negative at the output of the summing device 37 which controls the switch 36 using a comparator 38. The error signal $e_0$ is additionally applied to a proportional-integral regulator 40 shunted by a switch 39 which prevents it acting during the time period defined by the monostable 35. From the initial value n0 obtained, n is incremented during stopping by one unit, at a period of c1/f, up to the maximal value m.

The equation (2) given above for deceleration is justified as follows in the case considered here of a quadradic load.

Starting from the equation $e=(c/g)^{1/2}$ with e, c and g having the relative values already mentioned above, consider the speed w of the motor, also relative to the nominal value of that speed. This relative speed value is therefore between 0 and 1, like the other relative values e, c and g already considered.

The quadratic nature of the load in question (pump) implies:

$$c=w^2$$

whence $$e=w/g^{1/2}$$

Consider now the nominal slip a of the motor, the value of which is routinely around 0.04.

The relation between w and g is written $$w(1-a)=1-ag$$

where:

$$g=[1-w(1-a)]/a$$

whence:

$$e=a^{1/2}w[1-w(1-a)]^{-1/2}$$

Taking a =0.04 and taking a to be negligible compared to 1:

$$e=0.2\ w(1-w)^{-1/2}$$

For starting at constant acceleration it is possible to write w=t, the time t being expressed relative to the start time.

The following then applies:

$$e=0.2\ t(1-t)^{-1/2}$$

For stopping at constant deceleration it is possible to write:

$$w=1-t$$

t being relative to the stopping time, whence:

$$e=0.2(1-t)t^{-1/2}$$

which justifies the equation (2) with:

$$n/m=t$$

Figure 2:
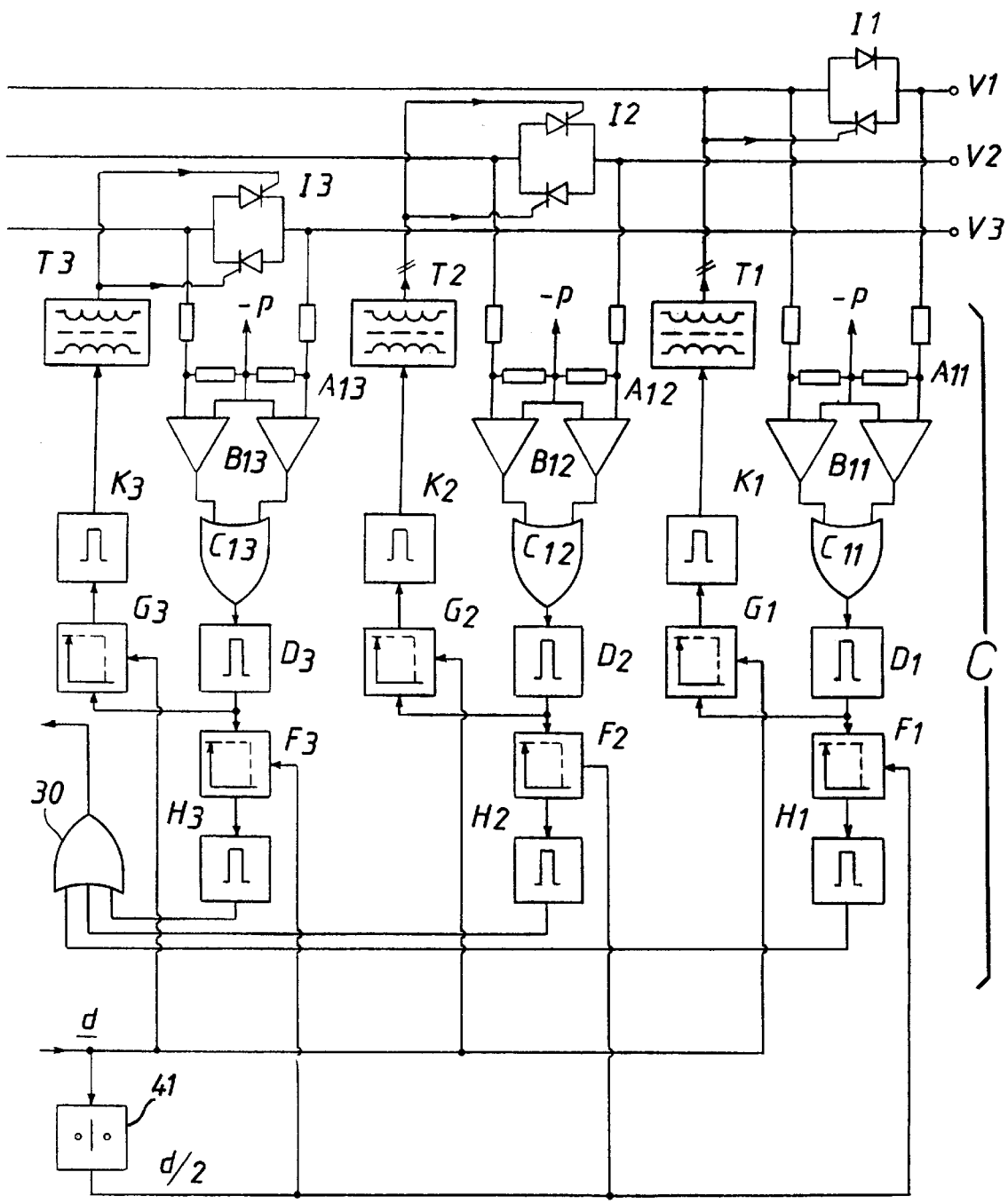
FIG. 2 shows a control system C for the switches I1, I2, I3.

C) Thyristor Control (FIG. 2)

The proportional-integral action regulator 40 that receives as input the error $e_0$ delivers a control signal d that defines the angle of non-conduction of the switches Ij for each half-period of the AC line voltage. The extinction of Ij is observed with the aid of one of three circuits made up of an attenuator network A11, A12, A13, a double comparator B11, B12, B13 and an OR circuit C11, C12, C13. During conduction the two outputs of the double comparator are low because of the effect of the −P bias at its input, which introduces a threshold corresponding to a few tens of volts at the terminals of the switches. Extinction is manifested in the appearance of a voltage at the terminals of the switch which, as soon as it crosses the threshold imposed by the bias −P, causes one or other output of the double comparator and that of the OR circuit to change to the high state, depending on its sign. The monostable D1, D2 or D3 generates a short pulse at extinction that initializes two groups of programmable monostables F1, F2, F3 and G1, G2, G3. The time-delay of the first group is equal to the value defined by the angle d/2 supplied by the regulator 40 and a divider 41. At the end of this time-delay the monostable F1, F2 or F3 goes high and the monostable H1, H2 or H3 generates a short pulse which triggers the sample and hold circuits 16 through 19 via the OR function 30. The time-delay of the second group is equal to the value defined by the angle d defined by the regulator 40. The time-delay signals delivered in the form of short pulses by monostables K1, K2 or K3 when G1, G2 or G3 goes high are applied to the primary of T1, T2 or T3 and cause the corresponding switches to conduct. As each switch is commanded in this way on each half-period of the AC line voltage, the stepwise voltage controller delivers the required voltage to the motor.

Of course, the invention is not limited to the example described, but encompasses all variant executions thereof within the scope of the claims.

I claim:

1. A method for controlling a multiphase induction motor during the time interval of predetermined transient operating conditions, said motor driving a load the resisting torque of which varies with the speed in accordance with a predetermined law, wherein the method comprises the steps of:

supplying said motor at constant frequency and variable voltage via static switches ($I_1, I_2, I_3$) by varying periods of conduction of said switches;

reading from a memory, in a predetermined sequence, a succession of prerecorded information representative of a succession of desired electromotive force amplitudes corresponding to a predetermined torque variation sequence during said predetermined transient operating conditions;

determining, during the same said time interval, the voltages ($W_1, W_2, W_3$) applied to said motor and the current (1) passing through its stator;

deducing from said voltages and said current, during the same time interval, the variation of the rotor electromotive force amplitude (e) developed by motor M; and controlling said static switches ($I_1, I_2, I_3$) by acting on their conduction intervals in order to permanently adjust said rotor electromotive force amplitude (e) to simultaneously read-in-memory electromotive force amplitude ($e_{ref}$) corresponding to said predetermined torque variation sequence during said predetermined transient operating conditions.

2. Method according to claim 1 wherein said variable voltage applied to the motor and the current flowing through it are sampled substantially synchronously and the sampled values are converted into digital signals, the amplitude of the rotor electromotive force being deduced from the aforementioned digital signals by computation in the digital domain, the electromotive force being treated as a vector.

3. The method according to claim 2 wherein the sampled values are substantially synchronized to the middle of an interval between the two conduction periods of said static switches.

4. The method according to claim 3 wherein the sampling is synchronized to each interval between two conduction periods.

5. The method according to claim 1 wherein the time succession of rotor electromotive force amplitudes is determined by application of the following equation:

$$e = (c/g)^{1/2}$$

where

- e is the electromotive force,
- g is the slip,
- c is the motor torque,
- e, g and c being expressed in values relative to the nominal rotor electromotive force, slip and torque of the motor, respectively.

6. The method according to claim 5 for a motor driving a load the resisting torque of which is a substantially quadratic function of the speed, wherein the time succession of the electromotive force amplitudes is determined by application of the following equation:

$$e = w(g)^{-1/2}$$

where w is the speed of the motor relative to the nominal speed of the motor.

7. The method according to claim 6 wherein the acceleration is substantially constant under transient operating conditions, and wherein the time succession of the rotor electromotive force amplitudes is determined by application of the following equation:

$$e = a^{1/2}(1-t)^{\alpha} t^{\beta}$$

with $$0 < t < 1 \text{ and } e \leq 1$$

where

- t represents the time relative to the duration of the transient operating conditions,
- a represents the nominal slip,
- $\alpha$ and $\beta$ are exponents with respective values $-\frac{1}{2}$ and 1 for starting and respectively 1 and $-\frac{1}{2}$ for stopping.

* * * * *

UNITED STATES PATENT AND TRADEMARK OFFICE
CERTIFICATE OF CORRECTION

PATENT NO. : 5,841,264
DATED : November 24, 1998
INVENTOR(S) : Claude CAËN

It is certified that error appears in the above-identified patent and that said Letters Patent is hereby corrected as shown below:

On the title page, item [75], the inventor's address should be:

--1 rue Louis Pasteur, 92100 Boulogne Billancourt, France--

Signed and Sealed this

Sixth Day of July, 1999

Attest:

Q. TODD DICKINSON

*Attesting Officer*  Acting Commissioner of Patents and Trademarks